United States Patent [19]
Kroeger

[11] Patent Number: 5,527,234
[45] Date of Patent: Jun. 18, 1996

[54] MOTOR VEHICLE AUTOMATIC TRANSMISSION SHIFT CONTROL SYSTEM

[75] Inventor: Torsten Kroeger, Stuttgart, Germany

[73] Assignee: Mercedes-Benz AG, Germany

[21] Appl. No.: 311,752

[22] Filed: Sep. 23, 1994

[30] Foreign Application Priority Data

Sep. 23, 1993 [DE] Germany .......................... 43 32 265.4

[51] Int. Cl.⁶ .................................................. B60K 41/24
[52] U.S. Cl. .................................. 477/80; 477/81; 74/335
[58] Field of Search ............................... 74/335; 477/77, 477/78, 80 OR, 81

[56] References Cited

U.S. PATENT DOCUMENTS

| | | |
|---|---|---|
| 5,085,106 | 2/1992 | Bubnash . |
| 5,277,290 | 1/1994 | Lasoen ................................. 74/335 X |
| 5,351,570 | 10/1994 | Mizunuma et al. ...................... 74/335 |
| 5,357,820 | 10/1994 | Moroto et al. ............................ 74/335 |
| 5,413,541 | 5/1995 | Nasset ................................... 477/78 X |

FOREIGN PATENT DOCUMENTS

| | | |
|---|---|---|
| 0444250 | 9/1991 | European Pat. Off. . |
| 0467773 | 1/1992 | European Pat. Off. . |
| 3717674 | 8/1988 | Germany . |

*Primary Examiner*—Charles A. Marmor
*Assistant Examiner*—Peter Kwon
*Attorney, Agent, or Firm*—Evenson, McKeown, Edwards & Lenahan

[57] ABSTRACT

In a system for controlling the shifting of an automatic transmission, a selector device is controllable from a "D" selected position into one of two shift positions for a stepwise shift limitation, by one gear at a time, manually. The respective upshift or downshift limitation can automatically be eliminated by fulfillment of a presettable condition, for example the expiration of a delay period.

18 Claims, 2 Drawing Sheets

MOTOR VEHICLE AUTOMATIC TRANSMISSION SHIFT CONTROL SYSTEM

BACKGROUND AND SUMMARY OF THE INVENTION

The present invention relates to a system for controlling the shifting of an automatic transmission of a has a "D" selected position in which all n forward gears are detected by a shifting program that determines the gear shift. An electronic control unit operates as a function of parameters of the driving state, engine operating point, and the position of the selector lever. The control unit can be actuated through the selector device when the latter is in the "D" selected position, into two shift positions optionally and pulsewise. An upshift limitation of the upshift program in one shift position, when the gear selected in the previous "D" selected position is not equal to n, decreases by one gear in steps, while in the other shift position, when the gear selected in the previous "D" selected position is not equal to 1, is expanded by one gear in steps.

In a known system of the type shown, for example, in DE 37 17 674 A1 with a selector lever guided in a shift gate, the shift gate has an L-shaped shift gate section, in which a lengthwise section with the "R" selection position runs rearward relative to the length of the vehicle from the "P" selection position located at the front, and terminates in a transverse section with the "N" selection position. Another lengthwise section runs rearward from the end of the transverse section opposite the "R" selection position and has a shift slot for the selector lever running in the lengthwise direction. In the shift slot, which is located in the transverse direction opposite the "N" selection position opposite the "R" selection position, a central spring-locking selection position "D, 1–n" is provided, in which all the forward speeds are detected by the shifting program of the control unit. In front of and behind selection position "D 1–n" there is a shift position ST, in which a step shift control can be shifted upward or downward by the selector lever. "1–n" represents the upshift limiting stages that can be controlled by the step shift control.

The purpose of this known system is to ensure that inadvertent improper shifts through the neutral position are avoided in the system for controlling the gearshift, and the movements required to actuate the selector lever resemble those of the shift lever of a manual transmission.

A system for controlling the shifting of an automatic transmission is known from U.S. Pat. No. 5,085,106 in which a selector keypad is used to actuate the selector for selected positions P-R-N-D-2-1. The selector keypad has a corresponding row of selector buttons located from top to bottom as well as laterally next to the steering wheel on the dashboard.

A system for controlling the shifting of an automatic transmission of a motor vehicle is described from EP 0 444 250 A1 in which a selector device operated by hand through a manual selector lever has a selected position "D" in which all of the n forward speeds are detected by a shifting program that determines the gearshifts. The program is located in an electronic control unit that operates as a function of the parameters of the driving state, the engine operating point, and the position of the manual selector lever. The control unit can be actuated optionally and pulsewise into two shift positions through the manual selector lever when the latter is in selected position "D". In the two shift positions, a stepwise upward or downward shift by one gear at a time is initiated from the current gear. The shift program is necessarily shut off when moving the manual selector lever from the "D" position into one of the shift positions for the stepwise shifting of the gears.

Similarly, EP 0 467 773 A1 shows a system for controlling the shifting of an automatic transmission of a motor vehicle in which a selector device actuated manually by a manual selector lever has a "D" selected position in which all four forward speeds are detected by a shifting program which determines the gearshifts in an electronic control unit that operates as a function of the parameters of the driving state, the engine operating point, and the position of the manual selector lever. The control unit can be actuated through the selector device, when the manual selector lever is in an "M" position, into two shifting positions optionally and pulsewise, in which an upshift or downshift by one gear is triggered stepwise. In this system, the manual selector lever is guided in a selector slot that extends in a straight line from front to rear in the direction of travel, at the front end of which selector slot the "P" position is located and at whose rear end the position "1" for first gear is located. While positions "R", "N", and "D" follow the "P" position in the usual sequence rearward, the "M" position is located in the selector slot immediately between the "D" position and the "1" position for first gear. The second gear and third gear are then manually shiftable by the manual selector lever in the "M" position in which the shifting program is shut off. An upper rpm limit is provided in this case for second gear, above which a shift into third gear is triggered when the engine rpm reaches its permissible maximum. Conversely, a lower rpm limit is critical for third gear, below which a shift into second gear is triggered when the engine rpm reaches a lower limiting value that causes the vehicle to stop.

In a certain known transmission of the planetary design in which the reaction drive element of first gear in coasting is supported by a freewheel to the housing, a lower rpm limit for second gear corresponds to the lower rpm limit for third gear to avoid stopping the vehicle. This is true of an upper rpm limit for first gear, above which a shift into second gear to avoid inadmissible engine rpms is triggered. As far as the upper rpm limit for second gear is concerned, however, it applies only to the range between partial and full load, since the upper rpm limit for first gear in the partial load range is displaced toward lower rpms in order to utilize the engine-braking effect, which does not exist in first gear during coasting because of the freewheel, in second gear even at low speeds.

An object of the present invention is to expand the range of functions of the electronic transmission control so that manual selection intervention in both directions is made possible, i.e. an early upshift is also possible, without thereby simultaneously having to leave the selected position "D" in the "fully automatic shifting program" mode.

This object has been achieved according to the present invention in an advantageous manner by providing that, in shift position "D(+)" for stepwise removal of the upshift limitation regardless of the shift program, an upshift can be triggered by setting a downshift limitation blocking those gears which are lower than the new gear selected by the upshift, against the shift program and an upshift or downshift limitation triggered by a shift position "D(+)" or "D(−)" by fulfillment of at least one predetermined condition such as the expiration of a delay period or the existence of a gear identity or the manner of accelerator operation or the like, is again removable automatically.

In the system according to the present invention, the shifting program remains fully automatic in the "D" selection position, and remains so. In other words, the performance of a downshift by way of the selector device does not result in blocking the previous speed until another manual upshift occurs. Instead, this upshift can still be made automatically by an electronic shifting device, in which the required conditions have been met.

The present invention can be provided both with a selector lever guided in a shift gate of the selector device, with a rocker switch for the shift positions corresponding to the known system of the type shown in DE 37 17 674 A1, and also with a selector keypad of the known arrangement in U.S. Pat. No. 5,085,106, whereby in the case of the selector keypad, for example, two shift buttons of this kind can be provided for shift positions "D (+)" and "D (−)" on both sides of the selector button for selected position "D" The system according to the present invention offers an option for adapting the shifting program to the driver's desire depending on the nature and frequency of the driver's interventions via the selector device.

An embodiment of the present invention is provided with a selector lever which effectively utilizes a parallel arrangement "H-rocker" of a second rocker switch with an "M" position and manual shifting program.

Moreover, the present invention provides, in addition to an expanded scope of function, simultaneous relief for the driver. That is, the possibility for the driver to intervene in selected position "D" in both directions without having to retract it, as well as by the possibility for shutting off the automatic function (position "M") which likewise can be performed directly through the selector device.

The expanded scope of function is obtained in the system according to the present invention from the combination of automatic shifting functions and manual intervention capability, on one hand, as well as the support of new, electronically realized shifting programs on the other hand.

In the system according to the present invention, the individual positions of the selector device have the following functions:

"P", "N", "R"—function as in an automatic transmission.

"D"—the transmission operates in accordance with its shifting program; the manually operable selector element additionally functions as a shifting member and thus permits manual intervention in both directions as well.

"M"—manual shifting by selector element; the automatic shifting program does not function (until an upshift at the regulation limit).

Advantageously, the present invention utilizes an alphanumeric display of the selector lever position and/or the current gear in an instrument cluster. A program selector switch can be eliminated in favor of an adaptive shifting program.

In an embodiment of the present invention with a selector lever that acts in the "D" selection position on a rocker switch or itself acts as a rocker switch, the rocker switch is provided in both "N" positions with an electrical contact as well as with a mechanical resistance which the driver can feel (i.e., pressure point). The selector lever cannot lock in these "N" positions, but automatically returns to the middle position (e.g., a return spring), but without a mechanical resistance being felt again.

Buffering of the electric contact is provided by software, as well as a protective function against inadvertent locking of the selector lever in one end position of the rocker switch, for example by resting some object thereagainst. In this case, only exactly one shift function will be performed.

Manual shifting through two or more gears can be advantageously performed by operating the selector device several times in quick succession.

The four selector positions "P", "N", "R", "D"="M" are provided in the hydraulic transmission control. In the electronic control there are at least three positions "P"="N"="R", "D", "M" and in positions "D" and "M", the two contacts of the shift positions.

Important new functions can be accomplished in the electronic transmission control by the system according to the present invention.

Following an operation of the selector in selected position "D", the full scope of functions of the automatic system is retained. Thus, for example, in the selector lever gate in known arrangements, downshifting with the selector lever, before a curve for example, initially always requires moving the selector lever to "D", since the automatic transmission otherwise cannot shift up again. In the system according to the invention, however, with appropriate driving behavior, a subsequent upshift is performed automatically. For this purpose, a state is assumed in the shifting logic when a shift is made with the selector device, in which the opposite shift according to the shift curve is initially prevented. This can only be performed as soon as the driver has conveyed his or her wishes by correspondingly changing the driving state. Therefore, the criterion for removing the shifting block can be coupled with the driver's wish (i.e., for example, at the accelerator).

In addition, the driver, by moving into the "M" position, can turn off this automatic removal of the shifting block at any time in favor of completely manual operation.

Thus, the system according to the present invention especially advantageously supports the use of a shift prevention logic which, in addition to intervention through the selector device, can also be provided for other functions in electronic transmission control (e.g., accelerator operation, frequency of shifting, and adaptation to road resistance.

Beginning with the premise that the driver does not want to operate the selector device at a precise moment and is satisfied with the existing shifting program, each selector actuation should perform an adaptation of the shifting program, with an influence in both directions by the shifting element being possible.

Such a function can logically supplement any other adaptation algorithms (e.g. adaptation to road resistance) and also offers advantages when there is an adaptive shifting program available that always assumes the same original state each time the vehicle is started. The adaptation capability through the selector device described above is helpful in this regard in order to adjust the shifting program as quickly as possible to the curve selected by the driver.

Another aspect of the present invention connects the electronic control unit with the electro-hydraulic shifting device of the transmission by a control line for gearshifts between two forward gears that are adjacent in terms of their gear ratios.

These and further objects, features and advantages of the present invention will become more readily apparent from the following detailed description thereof when taken in conjunction with the accompanying drawings of a selector lever guided in a shift gate and, more particularly, wherein:

DETAILED DESCRIPTION OF THE DRAWINGS

Figure 1:
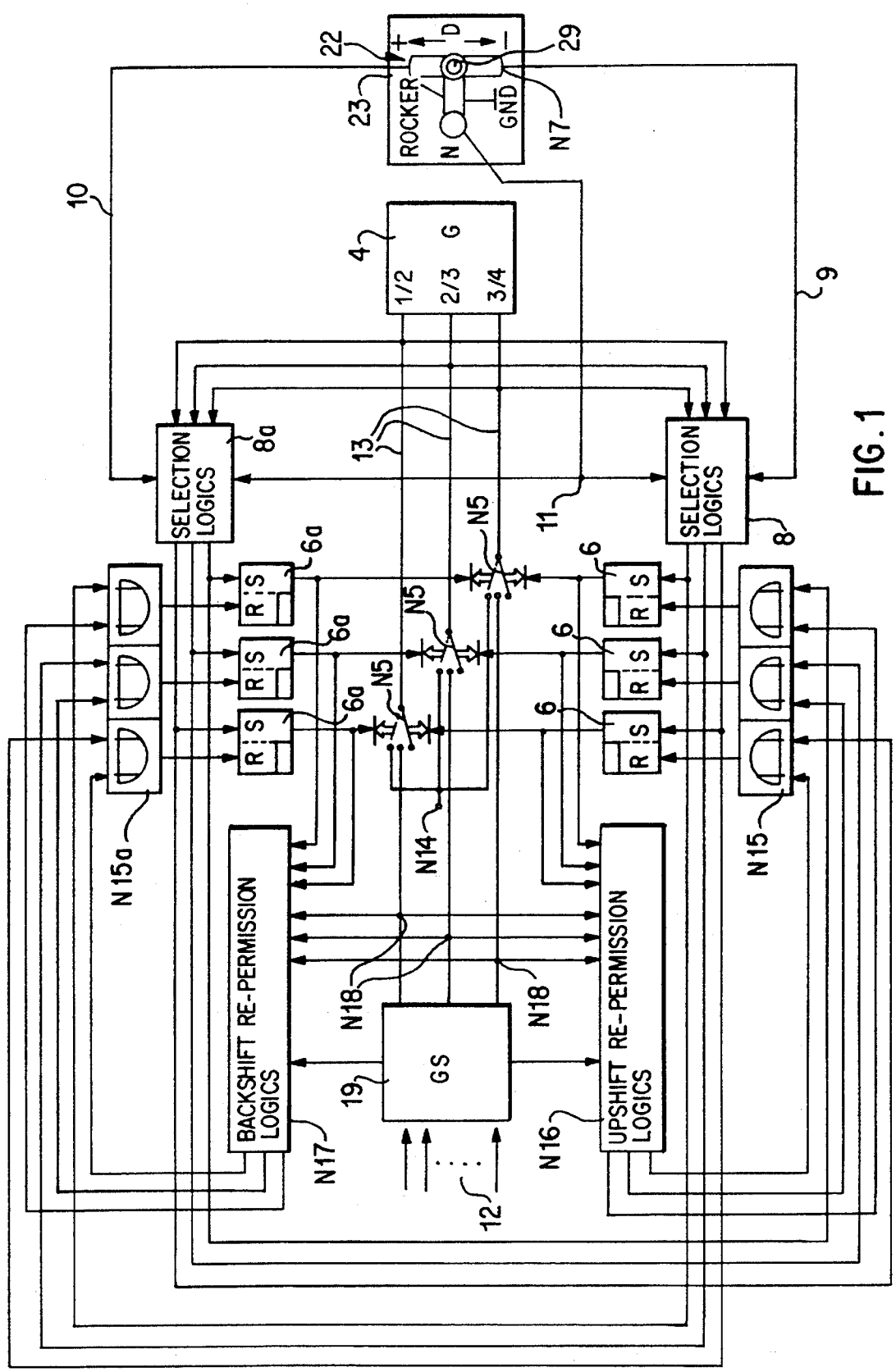
FIG. 1 is a block diagram of an overall system for controlling the shifting according to the present invention.
Figure 2:
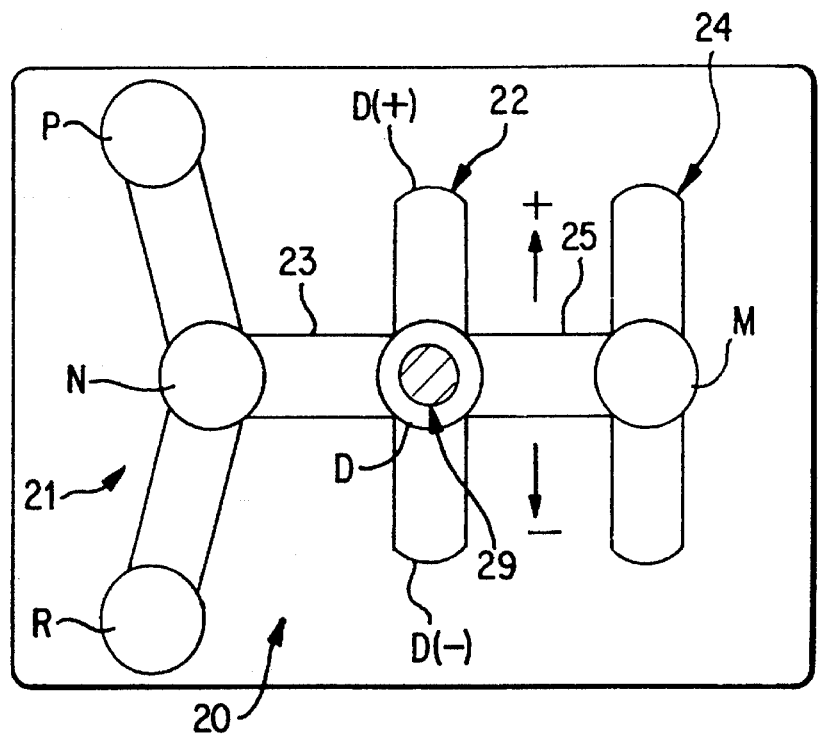
FIG. 2 is a plan view of shift gate for the selector lever in the system of FIG. 1.
Figure 3:
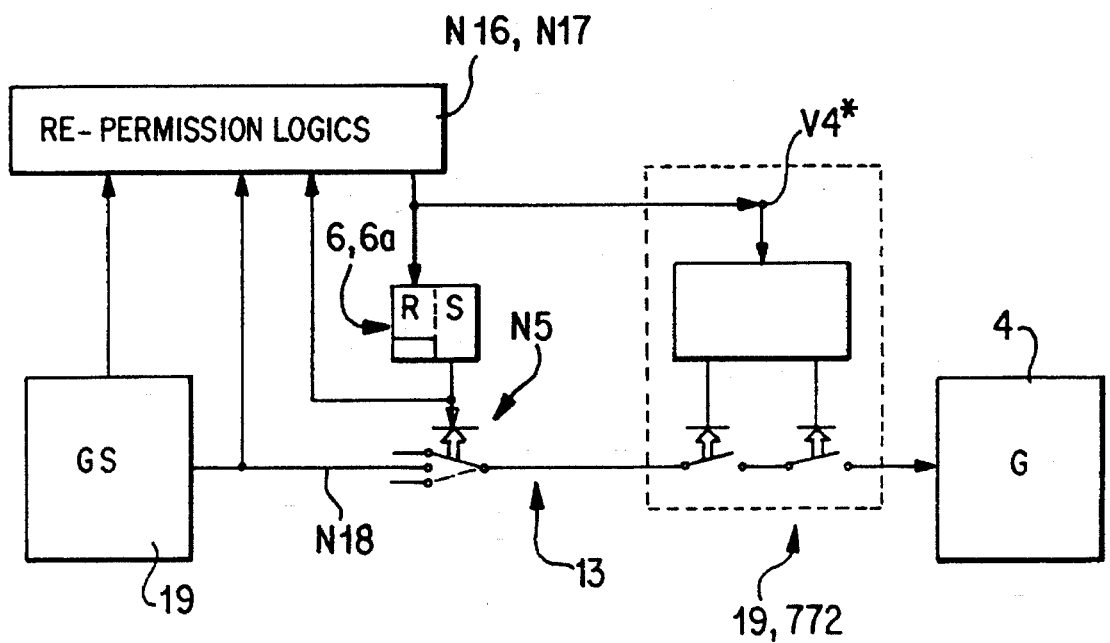
FIG. 3 is a simplified block diagram for linking the system of FIG. 1 with a known repermitting logic.

Beginning with reference to FIG. 2, a shift gate 20 for guiding a selector lever 29 for controlling the state of an automatic transmission 4 of the type shown in FIGS. 1 and 3 has a selector slot 21 for the known positions "P", "N", and "R" as well as a shift slot 22 for changing the shift limit of the current shifting program, according to which an electronic control unit 19 as shown in FIGS. 1 and 3 controls the gearshifts as a function of parameters 12 of the driving state, the engine operating point, and the position of selector lever 29.

The two slots 21 and 22 are connected together by a central section 23 that runs transversely to the latter for moving selector lever 29, with the "D" selected position for selector lever 29, in which all n forward gears are detected by the shifting program, being at the intersection between shift slot 22 and central section 23. From the "D" selected position, selector lever 29 can be moved in the manner of a rocker switch in one direction of shift slot 22 into a shift position "D (+)" for the stepwise removal of an upshift limit by one gear at a time and in the other direction in shift slot 22 into a shift position "D (−)" for the stepwise expansion of the upshift limit by one gear at a time, with a spring return.

On the side of shift slot 22 which is opposite selector slot 21, there is another shift slot 24 as well as an additional middle section 25 connecting the shift slots 22 and 24 for moving the selector lever 29. At the intersection between the shift slot 24 and the additional middle section 25, an "M" position for the selector lever 29 is provided in a known manner. When the selector lever 29 is in the shift slot 24, the shifting program is switched off and the transmission 4 can be shifted up or down by one gear at a time by the selector lever 29 operating as a rocker switch depending on whether it is moved in the direction of one shifting position "M (+)" or the other shifting position "M (−)" in the known manner.

The system according to the invention will now be described in greater detail with reference to FIG. 1. In particular, the selector lever 29, with a rocker switch N7 in lieu of a conventional selector lever, is connected with the gearshift control 19 of an automatic transmission 4 that the scope of functions of the conventional selector lever, which comprise the ability to downshift as well as a limit on upshifting, is expanded.

The device for automatic gearshift control consists of the aforementioned transmission control unit 19, which receives a plurality of the input signals 12 from the engine and vehicle, and which controls the corresponding gearshift devices of a transmission 4 located in a vehicle through control lines 13. A four-speed transmission is shown in FIG. 1, but the arrangement according to the present invention applies analogously to transmissions with any number (of two or more) speeds, for which a corresponding number of control lines ("number of gears minus 1"; three in the illustrated embodiment) and the elements described below are required.

The control logic of gearshift devices 4 is shown in Table 2; control lines 13 carry upshift signals. Via switches N5, therefore, a downshift can be initiated by interrupting a control line, or consequently an upshift specified by transmission control 19 is prevented (upshift limitation). By closing a switch N5, an upshift can only be initiated in the event that the transmission control 19 had already preselected this upshift (elimination of the upshift prevention).

TABLE 2

| Four-speed transmission | Control Leads Logic Table | | |
|---|---|---|---|
| | Control Leads 13 | | |
| | 1/2 | 2/3 | 3/4 |
| 1 | L | L | L |
| 2 | H | L | L |
| 3 | H | H | L |
| 4 | H | H | H |

H = High, L = Low

Switches N5 have three switch positions which, in addition to opening a control line 13 through flip-flops 6 (=downshift), alternatively, through flip-flops 6a, also permit a forced shift of high-level contact N14 to this control line 13 (=upshift).

Control of the switch N5 can be through the rocker switch N7. Of the two touch switch contacts of the rocker N7, each control line 9, 10 for downshift and upshift commands leads to a selector logic 8/8a which controls switches N5 according to Table 4 below, each through a flip-flop 6, 6a. Then selector logic downshift command 8 controls the set inputs of flip-flops 6 (with the switch N5 open) and the selector logic upshift command 8a. switches the set inputs of the flip-flops 6a (switch N5) to N14. The reset inputs of the flip-flops are also controlled by the selector logics 8, 8a. Through a symmetrical crosswise wiring of the reset inputs of flip-flops 6, 6a, a clear state is always assured for each switch N5. The selector logics have inputs to which control lines 13 are connected, so that information on the gear that has been engaged is always available. The control of their outputs is provided by a logic corresponding to Table 4 such that, depending on the gear engaged in transmission 4, certain switches N5 are opened for a downshift command 9 and switched to N14 for an upshift command 10.

According to the logic shown in Table 4, each downshift command leads directly to a downshift by exactly one gear unless first gear is already engaged. In addition, the selector logics 8, 8a are informed through an initialization line 11, when selector lever position "D" (=rocker switch) is engaged (from "N" ) or has been left (toward "N"). When the position "D" is engaged, upshift prevention is eliminated by closing all the switches N5 (initial position=starting state 4 in Table 4).

However, the reset inputs can also be actuated by a repermitting logic upshift N16 and a repermitting logic downshift N17, which at their inputs carry connections to the output leads of the flip-flops 6, 6a (=partial information on the shift status of N5) as well as control lines N18 (information on the gear preselection of transmission control 19).

A repermitting logic can be implemented in different ways. For this purpose, Table 3 provides a definition and the logic for an advantageously simple configuration, which will be used as the basis in the following and which also requires only the input signals mentioned above. Another especially advantageous apparatus for a repermitting logic is the subject of German Patent Application P 42 26 315.8-12.

Table 3: Definition Repermitting Logic

Repermitting logic (elements N16, N17; FIG. 1)

Goal:

Automatic elimination of an upshift or downshift lock triggered by previous selector lever operation, without another selector lever actuation being required therefor. The shift in question can be performed directly with the repermission action, but does not have to be.

Action:

When the repermission condition is met (see above), resetting of one (or more) switches N5 in the control leads in the middle position (see FIG. 1). Selection of the switch to be controlled, state-dependent corresponding to Table 4.

Example of Repermitting Logic Condition:
Repermitting takes place as soon as the gear selected by transmission control 19 (input information N18) is identical with the highest possible (repermitting logic upshift) or lowest possible (repermitting logic downshift) gear limited by switch position N5 (no shift takes place immediately)

or as soon as a certain delay has expired after the shift block was triggered (selector lever actuation) (the shift takes place immediately).

In addition, any other logics may be used for the repermitting logic condition, especially with the aid of other input and status signals from transmission control 19 (see FIG. 1).

An important feature in the system according to the present invention is the shift slot 22, in which the rocker switch N7 is identical to position "D". Therefore, the initialization line 11 is connected with the selector lever position "N", in order to achieve an initialization function when rocker position "D" is engaged. An additional parallel rocker in the "M" position with a scope of functions that corresponds to the known systems, can be expanded. In this case, the position can be indicated by an additional connecting lead of the transmission control or only the repermitting logic, in order to turn off automatic control in the "M" position (manual program function) or only the automatic repermission (upshift limitation function). These options are not shown FIG. 1 in order to emphasize the central aspects of the present invention but with the understanding that such options are within the scope of the present invention. From the selector logics 8, 8a (see Table 2), the selector logic also sends upshift set pulses to the flip-flops 6a.

The overall function of the system shown in FIG. 1 in conjunction with selector lever operation and repermission is shown in Table 4, in which the subsequent states are entered in a state matrix (initial state versus current gear) for each action.

TABLE 4

State Matrix for Selector and Repermitting Logic

| Current gear | Initial-state number | | | | | | | | | | Action N5 | | | | |
|---|---|---|---|---|---|---|---|---|---|---|---|---|---|---|---|
| | 1 | 2 | 3 | 4 | 5 | 6 | 7 | 8 | 9 | 10 | 1/2 | 2/3 | 3/4 | | |
| 1 | 8 | 8 | 9 | 5 | / | / | / | \ | \ | \ | H | — | — | (8a) | Shift stages of FIG. 1 |
| 2 | / | 10 | 10 | 6 | 6 | / | / | 10 | 10 | \ | H | H | — | | |
| 3 | / | / | 7 | 7 | 7 | 7 | / | \ | 7 | 7 | H | H | H | | |
| 4 | / | / | / | 4 | 5 | 6 | 7 | \ | \ | \ | — | — | — | | |
| 1 | 1 | 2 | 3 | 4 | / | / | / | \ | \ | \ | — | — | — | | |
| 2 | / | 1 | 1 | 1 | 1 | / | / | 1 | 1 | \ | L | L | L | | |
| 3 | / | / | 2 | 2 | 8 | 8 | / | \ | 8 | 8 | — | L | L | | |
| 4 | / | / | / | 3 | 9 | 10 | 10 | \ | \ | \ | — | — | L | | |
| | | | | | | | | | | | | | WH BACKSHIFT | | |
| 1 | 2 | 3 | 4 | 4 | / | / | / | \ | \ | \ | | | | | |
| 2 | / | 3 | 4 | 4 | / | / | / | 9 | 5 | \ | | | | | |
| 3 | / | / | 4 | 4 | / | / | / | \ | 5 | 6 | UPSHIFT | | | | |
| 4 | / | / | / | 4 | / | / | / | \ | \ | \ | RE-PERMISSION | | | | |
| | R | — | — | — | | | | as | as | as | Action N5-1/2 | | | | |
| | — | R | — | — | | | | No. | No. | No. | Action N5-2/3 | | | | |
| | — | — | R | — | | | | 2 | 3 | 3 | Action N5-3/4 | | | | |
| 1 | / | / | / | 4 | / | / | / | \ | \ | \ | | | | | |
| 2 | / | / | / | 4 | / | / | / | 2 | 3 | \ | | | | | |
| 3 | / | / | / | 4 | 4 | 5 | / | \ | 3 | 4 | BACKSHIFT | | | | |
| 4 | / | / | / | 4 | 4 | 5 | 6 | \ | \ | \ | RE-PERMISSION | | | | |
| | | | | R | — | — | as | as | as | Action N5-1/2 | | | | | |
| | | | | — | — | R | — | No. | No. | No. | Action N5-2/3 | | | | |
| | | | | — | — | — | R | 5 | 5 | 6 | Action N5-3/4 | | | | |
| | 1 | 2 | 3 | 4 | 5 | 6 | 7 | 8 | 9 | 10 | | | | | |
| | L | x | x | x | H | H | H | H | H | H | 1/2-switch N5 | | | | |
| | L | L | x | x | x | H | H | L | x | H | 2/3-switch N5 | | | | |
| | L | L | L | x | x | x | H | L | L | L | 3/4-switch N5 | | | | |
| | 1 | 1, 2 | 1–3 | 1–4 | 3–4 | 3, 4 | 4 | 2 | 2, 3 | 3 | Possible gears | | | | |

H = High, L = Low, x = Basic position, R = Reset pulse

Depending on the possible positions of switch N5, ten states can be distinguished which limit the possible gears differently upward or downward. Also shown are the control actions that are triggered by the selection and repermitting logics through flip-flops 6, 6a to switches N5. For the representation of a complete function according to Table 4, selector logics 8, 8a for outputting the correct control action require the input information on the current gear (status of control lines 13), while the repermitting logics N16, N17 on the other hand require the shift status of the flip-flops 6, 6a which they can reset (partial information on the switch status of switches N5). The control actions to be performed for the selector logics correspond to Table 2; the repermitting logics each cause a reset of individual flip-flops and hence the repermission of an individual gear by closing the switch N5 (=connecting control lines 13 and N18).

With the system according to FIG. 1, the function of a transmission control with a rocker switch N7 integrated into selector lever position "D" with retention of the automatic shifting program is achieved. This is shown once again in Table 4* in an example (SL=selector lever 29):

all four gears are admissible as determined by control unit 19. This is followed by third gear.

TABLE 4*

State Matrix for Selector and Repermitting Logic

| Current gear | Initial-state number | | | | | | | | | | Action N5 | | |
|---|---|---|---|---|---|---|---|---|---|---|---|---|---|
| | 1 | 2 | 3 | 4 | 5 | 6 | 7 | 8 | 9 | 10 | 1/2 | 2/3 | 3/4 |
| 1 | 8 | 8 | 9 | 5 | / | / | / | \ | \ | \ | H | — | — |
| 2 | / | 10 | 10 | 6 | 6 | / | / | 10 | 10 | \ | H | H | — |
| 3 | / | / | ⑦ | 7 | 7 | 7 | / | \ | 7 | 7 | H | H | H |
| 4 | / | / | | 4 | 5 | 6 | 7 | \ | \ | \ | — | — | — |
| | | | | | | | | | | | WH UPSHIFT | | |
| 1 | 1 | 2 | 3 | 4 | / | / | / | \ | \ | \ | — | — | — |
| 2 | / | 1 | 1 | 1 | 1 | / | / | 1 | 1 | \ | L | L | L |
| 3 | / | / | 2 | ② | 8 | 8 | / | \ | 8 | 8 | — | L | L |
| 4 | / | / | | 3 | 9 | 10 | 10 | \ | \ | \ | — | — | L |
| | | | | | | | | | | | WH BACKSHIFT | | |
| 1 | 2 | 3 | 4 | 4 | / | / | / | \ | \ | \ | | | |
| 2 | / | ③ | 4 | 4 | / | / | / | \ | 9 | 5 | \ | | |
| 3 | / | | 4 | 4 | / | / | / | \ | \ | 5 | 6 | UPSHIFT | |
| 4 | / | | 4 | 4 | / | / | / | \ | \ | \ | RE-PERMISSION | | |
| | R | | | | | | | as | as | as | Action N5-1/2 | | |
| | | R | | | | | | No. | No. | No. | Action N5-2/3 | | |
| | | | R | | | | | 2 | 3 | 3 | Action N5-3/4 | | |
| 1 | / | / | | 4 | / | / | / | \ | \ | \ | | | |
| 2 | / | / | | 4 | / | / | / | 2 | 3 | \ | | | |
| 3 | / | / | | 4 | 4 | 5 | / | \ | 3 | 4 | BACKSHIFT | | |
| 4 | / | / | | 4 | 4 | 5 | ⑥ | \ | \ | \ | RE-PERMISSION | | |
| | | | | R | — | | as | as | as | Action N5-1/2 | | | |
| | | | | — | R | | No. | No. | No. | Action N5-2/3 | | | |
| | | | | — | — | R | 5 | 5 | 6 | Action N5-3/4 | | | |
| | 1 | ② | ③ | ④ | 5 | ⑥ | ⑦ | 8 | 9 | 10 | | | |
| Example- | L | x[b] | x[c] | x[a] | H | H[e] | H[d] | H | H | H | 1/2- switch N5 | | |
| | L | L | x | x | x | H | H | L | x | H | 2/3- switch N5 | | |
| | L | L | L | x | x | x | H | L | L | L | 3/4- switch N5 | | |
| | 1 | 1,2 | 1–3 | 1–4 | 2–4 | 3,4 | 4 | 2 | 2,3 | 3 | Possible gears | | |

H = High, L = Low, x = Basic position   R = Reset pulse a. Initial Position

All three switches N5 are in the rest position E (i.e., transmission 4 is connected with the electronic control unit 19). In Table 4 this position corresponds to initial state 4, and b. Action: SL downshift 3–2

Assume that the driver actuates a rocker to "D(−)". This action sets the switches N5/2–3 and N5/3–4 to L and through a 3–2 downshift of the transmission leads to the new logic state 2 (switch position x, L, L), in which only gears 1 and 2 can be preset by the transmission control 19, and gears 3 and 4 are blocked.

c. Repermission of Third Gear

Then the condition of the repermitting logic upshift is met. A reset command to N5/2-3 causes a shift to logic state 3 (switch position x, x, L), in which third gear is possible again as well. When an upshift command from the control unit 19 is applied to the control lead 2-3 (upshift curve 2-3 is exceeded), this is immediately followed by an upshift into third gear. Fourth gear continues to be blocked.

d. Action: SL Upshift 3-4

A subsequent actuation of rocker switch N7 to "D(+)", through the action "all three switches N5 to H" with a transition to logic state 7, causes an upshift to fourth gear. Then gears 1 to 3 are blocked.

e. Repermission of Third Gear

A subsequent response of the repermitting logic downshift also permits third gear once again through a reset command on N5 3-4 with a transition to logic state 6 (switch position H, H, x).

Table 4 shows only one logic scheme out of other possible ones that are obtained with proper insertion of all the numbers into Table 4 and thus in certain actions, cause a transition to another logic state. These other logic schemes are also within the contemplation of the present invention.

FIG. 3 is a simplified version of the system in FIG. 1 such that the repermitting logics N16, N17 are connected on the input side with transmission control 19, control leads N18, and the outputs of flip-flops 6, 6a, while the repermitting logics N16, N17 are connected on the output side with the reset inputs of flip-flops 6, 6a, which control the switches N5 between control leads N18 and 13.

The system in FIG. 1 is thus connected with the repermitting logic 19.772 in FIG. 2 of German Patent Application P 42 26 315.8-21, such that the reset input of a flip-flop 6, 6a of the present system is connected with input V4* of repermitting logic 19,772 and control lead 13 according to FIG. 1 of the present system is connected by switches 101 and 102 of repermitting logic 19.772 with transmission 4.

The repermitting logic 19,772 operates as follows in a system for automatically changing the transmission ratio of a transmission that is located downstream in the power flow direction from a driving motor in a motor vehicle. In a shift into a higher gear (upshift) in which an electronic control unit forms an upshift signal depending both on the load on the driving motor as well as the operating speed, and is connected through an upshift lead for transmitting the upshift signal with an electrohydraulic shifting device of the transmission, and a switch located in the upshift lead is opened to suppress the upshift by setting a bistable flip-flop stage when the upshift signal is present and a recognition stage responds to the change in level of a blocking signal to prevent the upshift and emits a signal to set the bistable flip-flop stage. The reset input of the bistable flip-flop stage can be affected by a signal to permit the upshift once more by closing the switch, with the signal corresponding to a significant position of the accelerator and emitted when the accelerator is operated after the bistable flip-flop stage has been set in the significant position, and in which the significant position is determined by a threshold value stage located in a line that connects the reset input with a path sensor controlled by the accelerator. A delay element that can be switched on by the upshift signal controls a switch in the opening direction during its travel time, which, together with the switch controllable by the bistable flip-flop stage, is connected in series in the upshift lead. The threshold value stage has a variable threshold value as a function of the position of the accelerator, which is adjustable to a constant path difference above the current position and is lockable when the delay element is switched on, so that the significant position varies only by the constant path difference from the position in which the accelerator was located momentarily when the switch controllable by the delay element was opened, with the switch controllable by the delay element, which can be switched on by means of the upshift signal, being additionally controllable by a delay device which, depending both on the delay element and also on the threshold value stage, operates such that this switch remains open for an operating time determined by the delay device when the signal corresponding to the significant position appears and is used to switch on the delay device.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A system for controlling shifting of a motor vehicle automatic transmission, comprising a manually operated selector device having a "D" selected position in which all n forward gears are configured to be detected by a shifting program which determines the gear shift, an electronic control unit configured to operate as a function of parameters of driving state, engine operating point, and position of a selector lever, the control unit being actuatable through the selector device when the latter is in the "D" selected position, into two shift positions optionally and pulsewise, with an upshift limitation of the upshift program in one of the two shift positions, when the gear selected in the previous "D" selected position is not equal to n, decreases stepwise by one gear, and in the other of the two shift positions, when the gear selected in the previous "D" selected position is not equal to 1, is expanded stepwise by one gear, wherein, in a shift position (D(+)) for stepwise removal of the upshift limitation independent of the shift program, an upshift is triggerable by setting a downshift limitation blocking those gears which are lower than the new gear selected by the upshift, against the shift program, and one of an upshift and downshift limitation triggered by a shift position (D(+) or D(−)) by fulfillment of at least one predetermined condition is again removable automatically.

2. The system according to claim 1, wherein a shift program operating adaptively is used depending on the frequency of actuation into shift positions (D(+) and D(−)).

3. The system according to claim 1, wherein there is provided a shift slot with shift positions (D(+) and D(−)) for the stepwise change of shift limitation by a selector lever, and a shift slot for stepwise upshifting and downshifting by one gear at a time by the selector lever without the shift program.

4. The system according to claim 3, wherein a shift program operating adaptively is used depending on the frequency of actuation into shift positions (D(+) and D(−)).

5. The system according to claim 1, wherein a control lead connects the control unit with shift device of the transmission, for shifting between two adjacent forward speeds, a three-position switch is provided in the control lead which, in switch position (D(+)) of the selector device for removal of the upshift limitation, is controllable into an upshift position that connects shifting device with a signal level connection for an upshift independent of the shift program, and in shift position (D(−)), expands the upshift limit into a downshift position that connects the shifting device with a signal level connection for a downshift that is independent of the shift program.

6. The system according to claim 5, wherein a shift program operating adaptively is used depending on the frequency of actuation into shift positions (D(+) and D(−)).

7. The system according to claim 6, wherein there is provided a shift slot with shift positions (D(+) and D(−)) for the stepwise change of shift limitation by a selector lever, and a shift slot for stepwise upshifting and downshifting by one gear at a time by the selector lever without the shift program.

8. The system according to claim 5, wherein the three-position switch is configured to be controllable by the selector device into an upshift position by a bistable flip-flop stage controlled by the selector device through a shift stage operating according to a selector logic upshift.

9. The system according to claim 8, wherein the three-position switch is configured to be controllable by the flip-flop stage into a basic position that connects the control unit with the shift device, and the flip-flop stage is additionally configured to be controllable by a shift stage which operates according to a repermitting logic downshift and is connected with a control output of the flip-flop stage.

10. The system according to claim 5, wherein the three-position switch is configured to be controllable into a reset position by a second bistable flip-flop stage controllable through a switching stage operating according to a selector logic downshift by the selector device.

11. The system according to claim 10, wherein the three-position switch is additionally controllable through the second flip-flop stage, which operates according to a selector logic downshift, into a basic position, and the second flip-flop stage is additionally controllable by a switch stage which operates according to a repermitting logic upshift and is connected with the control output of the second flip-flop stage.

12. The system according to claim 10, wherein a mutual forced control of the two flip-flop stages for downshifting and upshifting of three-position switch is such that a control input (reset), corresponding to the basic position of three-position switch, of one flip-flop stage is connected with a control input (set) of the other flip-flop stage which does not correspond with the basic position.

13. The system according to claim 12, wherein the control input (reset) corresponding with the basic position of three-position switch of the flip-flop stages is permanently connected with the output of a corresponding OR element, and one input of the corresponding OR element is connected with switch stage operating with a repermitting logic connected with the control output of the corresponding flip-flop stage, while the other input of the corresponding OR element is connected with the control input of the other flip-flop stage which does not correspond with the basic position of the three-position switch.

14. The system according to claim 5, wherein one input each of shift steps operating with a selector logic is connected with a section of the control lead connecting the three-position switch with the shifting device.

15. The system according to claim 14, wherein the three-position switch is configured to be controllable by the selector device into an upshift position by a bistable flip-flop stage controlled by the selector device through a shift stage operating according to a selector logic upshift.

16. The system according to claim 15, wherein the three-position switch is configured to be controllable by the flip-flop stage into a basic position that connects the control unit with the shift device, and the flip-flop stage is additionally configured to be controllable by a shift stage which operates according to a repermitting logic downshift and is connected with a control output of the flip-flop stage.

17. The system according to claim 5, wherein the shift stages operating according to a repermitting logic have one input connected with the control unit and one input connected with a section of the control lead connecting the control unit with the three-position switch.

18. The system according to claim 9, wherein one input each of shift stages operating with a selector logic is connected with a signal connection of the selecting device such that the three-position switch is shifted into the basic position when an actuation of the selector device in the direction of a position change between the "D"-selected position and another selected position (N) occurs.

* * * * *